United States Patent [19]

Pollner et al.

[11] Patent Number: 4,923,253
[45] Date of Patent: May 8, 1990

[54] BRAKING SYSTEM FOR AIRCRAFT TOWING VEHICLE

[75] Inventors: Juergen Pollner, Munich; Gregor Trummer, Aschering; Peter Moelzer; Karl Fichtner, both of Schwabhausen, all of Fed. Rep. of Germany

[73] Assignee: Krauss Maffei AG, Munich, Fed. Rep. of Germany

[21] Appl. No.: 250,273

[22] Filed: Sep. 28, 1988

[30] Foreign Application Priority Data

Sep. 28, 1987 [DE] Fed. Rep. of Germany ....... 3732647

[51] Int. Cl.⁵ .......................... B60T 7/06; B60T 8/18; B60T 8/26
[52] U.S. Cl. .......................................... 303/7; 188/195; 188/349; 188/106 P; 244/50; 303/9.61; 303/9.63; 303/9.69; 303/9.71; 303/52; 180/14.1
[58] Field of Search ...................... 303/7-8, 303/6.01, 9.62, 9.63, 9.69, 9.71, 9.72, 9.73, 9.74, 9.75, 9.61, 22.1, 22.4, 22.5, 22.8, 52, 56, 10, 2; 188/106 P, 106 R, 195, 349; 180/14.1; 414/430, 429, 427, 426; 244/50, 111

[56] References Cited

U.S. PATENT DOCUMENTS

| | | | |
|---|---|---|---|
| 2,147,955 | 2/1939 | Baits | 188/106 P |
| 2,905,273 | 9/1959 | Kohler | 188/106 P X |
| 3,155,433 | 11/1964 | Brueder | 303/22.4 X |
| 3,371,754 | 3/1968 | Lepelletier | 303/22.1 X |
| 3,375,909 | 4/1968 | Lapelletier | 303/22.1 X |
| 3,410,608 | 11/1968 | Cadioa | 188/349 X |
| 3,415,576 | 12/1968 | Biaband | 303/22.8 X |
| 3,475,059 | 10/1969 | Klein | 303/22.5 X |
| 3,477,549 | 11/1969 | Barton | 188/106 P X |
| 3,702,207 | 11/1972 | Armstrong | 188/349 |
| 3,787,095 | 1/1974 | Menar | 303/22.1 X |
| 3,825,308 | 7/1974 | Kasselmann et al. | 188/349 X |
| 3,964,794 | 6/1976 | Scholz | 188/349 X |
| 4,007,890 | 2/1977 | Bremer et al. | 244/50 |
| 4,040,673 | 8/1977 | Ahaus et al. | 303/9.69 |
| 4,113,041 | 9/1978 | Birkeholm | |
| 4,143,925 | 3/1979 | Young | 303/22.5 |
| 4,251,114 | 2/1981 | Belart | 303/9.61 |
| 4,300,805 | 11/1981 | Reinecke | 303/9.69 |
| 4,302,056 | 11/1981 | Kawaguchi | 303/9.71 |
| 4,548,445 | 10/1985 | Mizwawa et al. | 303/22.4 |
| 4,795,004 | 1/1989 | Bauer | 188/106 P |

FOREIGN PATENT DOCUMENTS

| | | |
|---|---|---|
| 299731 | 6/1972 | Austria . |
| 620337 | 9/1935 | Fed. Rep. of Germany . |
| 1755021 | 3/1968 | Fed. Rep. of Germany . |
| 1803586 | 10/1968 | Fed. Rep. of Germany . |
| 1480313 | 10/1969 | Fed. Rep. of Germany . |
| 2306154 | 10/1973 | Fed. Rep. of Germany . |
| 2815337 | 10/1983 | Fed. Rep. of Germany . |
| 3311556 | 10/1984 | Fed. Rep. of Germany . |
| 3312981 | 10/1984 | Fed. Rep. of Germany . |
| 3327628 | 2/1985 | Fed. Rep. of Germany . |
| 3327629 | 2/1985 | Fed. Rep. of Germany . |
| 72004487 | 2/1972 | France . |
| 2084271 | 9/1980 | United Kingdom . |

Primary Examiner—Douglas C. Butler
Attorney, Agent, or Firm—Townsend and Townsend

[57] ABSTRACT

A braking system for an aircraft towing vehicle which supports the nose wheel of an aircraft in a raised position and firmly clamps it to the vehicle. The braking force generated by the front wheels of the towing vehicle is greater by about 2:1 to 8:1 than the braking force at the rear wheels. The braking system has two hydraulic circuits employing identical braking cylinders at all four wheels of the vehicle. The number of cylinders per wheel are varied and different effective lever arms are used to generate like braking forces at each side of the vehicle, and the relatively greater braking force at the front wheels, even if one of the hydraulic circuits fails. The system limits the braking force at the front and rear wheels to maximum values to prevent excessive forces from damaging the nose gear of relatively smaller aircraft. The load carried by the vehicle is hydraulically sensed by tapping into the hydraulic leveling system to increase the braking forces that are generated when towing relatively heavier aircraft which is able to withstand such greater forces.

17 Claims, 3 Drawing Sheets

BRAKING SYSTEM FOR AIRCRAFT TOWING VEHICLE

The invention relates to a braking system for aircraft towing vehicles of the type which lift the nose wheel of an aircraft above ground and clamp it to the vehicle at a point intermediate the front and rear wheels of the vehicle.

BACKGROUND OF THE INVENTION

Such aircraft towing vehicles are disclosed, for example, in German patent publications DE-OS 33 27 628 and DE-OS 33 27 629. This kind of towing vehicle forms an essentially rigid unit with the clamped nose wheel of the plane being towed so that even very large and heavy planes can be towed and maneuvered more simply, safely and rapidly than was possible with towing vehicles which are connected to the nose wheel landing gear ("nose gear") with a draw bar. It becomes therefore possible to use towing vehicles of the kind to which the present invention relates for taxiing fully loaded aircraft between the terminal and the runway. This eliminates the need to use the aircraft engines to taxi the plane to and from the runway which results in a significant savings in fuel and other costs and greatly abates the often objectionable noise around airports. This cannot be accomplished with towing vehicles employing draw bars because the instability in the towing unit, i.e., the towing vehicle and the aircraft connected thereto, permits only very low towing speeds.

The concept of a towing vehicle that is rigidly connected to the nose wheel and the contemplated relatively high towing speeds present additional demands for the towing operation itself. One requirement is that during towing the forces that are transferred to the nose wheel may not overload or damage the nose gear. Another requirement is that under no circumstances may the connection between towing vehicle and nose wheel become uncoupled during towing. This contrasts with conventional towing vehicles employing draw bars in which a shear pin forms the connection between the nose wheel and the vehicle. It will shear off under overload conditions and thereby release the nose wheel before it could be damaged by excessive forces.

Forces which can cause directional instability of the towing unit and overload conditions in the nose gear occur primarily during braking. If, when the brakes are applied, the longitudinal axis of the towing vehicle is at an angle to the longitudinal axis of the aircraft, as occurs, for example, during turning, then the ground frictional forces of the vehicle's wheels, on the one hand, and the momentum of the large aircraft mass on the other, generate a rotational moment about a vertical axis of the vehicle. It tends to increase the angle between the axes of the vehicle and the aircraft and can result in jack-knifing during which the towing vehicle spins out under the aircraft and twists the nose wheel relative to the aircraft. An excessive twisting of the nose wheel can seriously damage the entire nose gear.

Maneuvering towing vehicles of the kind proposed herein is, to be sure, inherently more directionally stable and less prone to jack-knifing than maneuvering vehicles of the draw bar type. Nevertheless, an unstable condition may arise during braking if the rear wheels prematurely lose ground traction, which can result in an excessive nose wheel rotation and, consequently, in damage to the nose gear.

U.S. Pat. No. 4,113,041 discloses a towing vehicle which is connected to the wheel landing gear via a draw bar. To avoid unstable driving conditions and, in particular, jack-knifing, the drive and/or braking power of the towing vehicle are controlled and limited as a function of the pulling or pushing force in the draw bar. Braking is primarily effected with the aircraft's landing gear brakes. They are either operated directly from the towing vehicle via remote control or by the aircraft's pilot with the aid of braking commands emanating from the towing vehicle or visually signaled him. Such a system either requires a compatibly equipped aircraft having a braking system which can be remote controlled from the towing vehicle itself or, should the pilot have to rely on braking commands relayed to him from the towing vehicle, it will be extremely unreliable and failure prone.

It is axiomatic that a new type of towing vehicle, e.g., the one of the present invention, will only be employed if it can be used to tow all commonly encountered passenger airliners without requiring their modification with expensive additional equipment to make them compatible with the new towing vehicle. Furthermore, it is desirable that operation of the towing vehicle be either completely independent of, or as little dependent as possible, on complicated, preprogrammed controls, associated sensors, signal transmitters and transmission lines, and the like. Because of the rugged working conditions typically encountered at airports, extreme weather conditions, and electronic interference resulting from the proximity of powerful sources of electromagnetic signals, etc., such controls are very susceptible to malfunction. A malfunctioning control system for the towing vehicle can create dangerous situations which, for safety reasons, are intolerable.

It is basic knowledge (cf., for example, DE-OS 33 11 556) that, in braking systems for standard vehicles, front and rear wheel braking forces are differentially controlled in such a way that the braking force generated by the front wheels is always greater than that generated by the rear wheels. This compensates for the relatively greater forces to which the front wheels are subjected during braking. DE-OS 28 15 337 discloses a braking system with dual brake circuits in which the brake circuits can include various combinations of front and rear wheels. For example, FIG. 4 discloses an arrangement in which each circuit encompasses both front wheels and one of the rear wheels. However, the publication is silent as to the actual braking forces that are to be applied to the wheels controlled by the respective brake circuit.

SUMMARY OF THE INVENTION

In view of the foregoing requirements, it is an object of the present invention to provide a braking system which reliably, and with simple, straightforward means, prevents the application of excessive forces to the nose wheel and the nose gear when the towing vehicle brakes and which, in particular, eliminates jack-knifing of the towing unit.

Broadly speaking, the braking system of the present invention employs two parallel but independent braking circuits, each acting on both front wheel but only on one of the two rear wheels. The braking circuit, acting alone, generates braking forces on the wheels on one side of the vehicle which equal the braking forces generated by the wheels on the other side of the vehicle. Further, each circuit generates braking forces at the front wheels of the vehicle which are substantially greater than the braking force generated at the coupled rear wheel. Thus, irrespective of whether one or both braking circuits are operative, the braking forces on both sides of the vehicle will always be equal. Further, the braking forces generated by the front wheels will always exceed the forces generated by the rear wheels, preferably by a ratio of at least 2:1 and not more than about 8:1.

Thus, even in the event one brake circuit fails, the other brake circuit still provides an identical braking ability to both sides of the vehicle, that is, without generating a rotational moment about a vertical axis. This is achieved because the braking force generated by the front wheels is considerably greater that generated by the rear wheels irrespective of whether only one is operative or both brake circuits work together. This ensures that in the event of excessive braking, when the vehicle's wheels lock, especially on a wet or slippery roadway, the front wheels will lock up first while the rear wheels continue to turn and, therefore, maintain lateral traction. The roadsurface traction of the still turning rear wheels then generates, in conjunction with the inertia force of the aircraft, a rotational moment relative to the vertical axis of the towing vehicle which tends to straighten the towing unit. The jack-knifing effect is thereby eliminated, that is, the locking of some of the towing vehicle wheels. i.e., the front wheels, does not tend to increase the relative angular inclination of the towing vehicle and the aircraft. Possible damage to the nose gear therefore is prevented.

A particularly advantageous aspect of the present invention is that this is achieved in a simple and efficient manner by fitting the wheels of the towing vehicle with a minimum number of identical brake cylinders. Differential braking forces are generated without the need to individually control the pressure of hydraulic fluid supplied to each wheel by employing effective mechanical braking levers of appropriately different lengths and/or by varying only the number of braking cylinders for the wheels.

Another important aspect of the present invention is that the braking force exerted by the towing vehicle and transferred via the nose wheel to the aircraft cannot reach a magnitude which could result in an overload condition on the nose gear. The maximum braking force which can be generated is preferably set so that smaller aircraft types, and their correspondingly smaller nose gears, suffer no damage. The maximum braking force that can be generated can be increased in accordance with the present invention to provide the greater braking forces that are required when towing large and heavy aircraft which have nose gears that are commensurately stronger and can withstand such larger forces.

Another aspect of the present invention provides a leveling system for the towing vehicle which maintains a constant ground clearance for the vehicle irrespective of the load carried by the nose wheel clamped thereon. This is hydraulically achieved and the resulting variations in the hydraulic pressure in the leveling system are employed to correspondingly increase or decrease the braking force that is generated by the towing vehicle. Consequently, the braking force is controlled without the need for sensors to independently measure the dead weight on the nose wheel or any devices which process such sensor signals. The weight-dependent pressure in the leveling system is used directly to control the hydraulic pressure applied to the braking cylinder. In this manner, the present invention effects aircraft weight dependent variations in the braking force it generates using the hydraulic circuit and components which are already present on the vehicle.

DESCRIPTION OF THE PREFERRED EMBODIMENT

Figure 1:
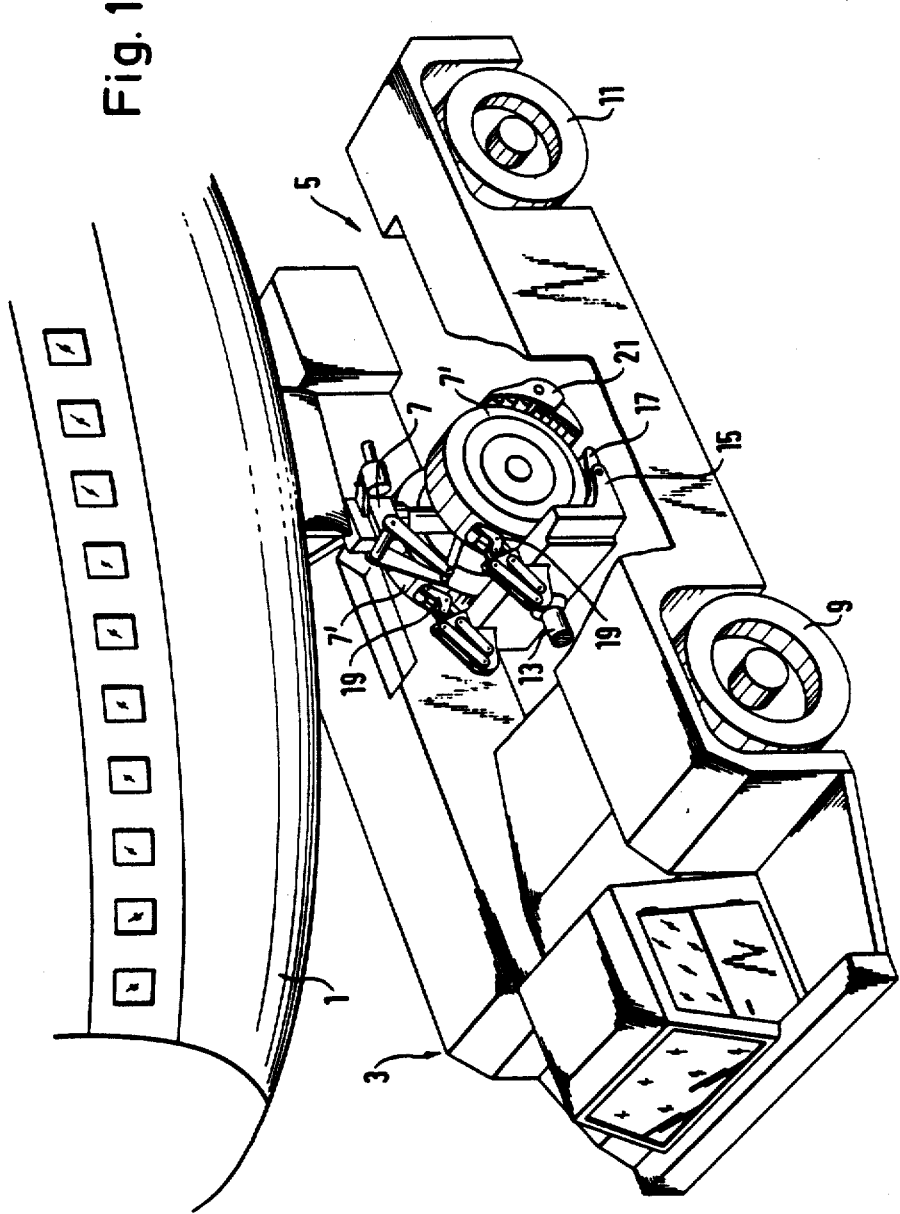
FIG. 1 is fragmentary, perspective view of the aircraft towing vehicle of the present invention towing an aircraft.

An aircraft towing vehicle 3 constructed in accordance with the present invention is shown in FIG. 1 towing a wide-bodies aircraft 1. It has a fork-shaped frame that forms a rearwardly open recess 5 for receiving the nose wheels 7 of an aircraft 1. A lifting and clamping arrangement on the frame raises the nose wheels into a towing position where they are rigidly secured to the vehicle at a point between the vehicle s front wheels 9 and rear wheels 11.

The example of a lifting and locking arrangement shown in FIG. 1 includes a stop plate 15 which pivots about a longitudinal axis 13, a tiltable nose wheel supporting ramp 17, holders 19 which engage the nose Wheels from above, and swiveling lifters 21 which engage the nose wheels 7' from behind and which are power driven to push the nose wheels onto and up ramp 17. These components act on the peripheries of nose wheels 7 and rigidly clamp them in position. The design of the lifting and locking arrangement is of no consequence, is not part of the present invention and it can also be constructed in other, suitable manners.

Figure 2:
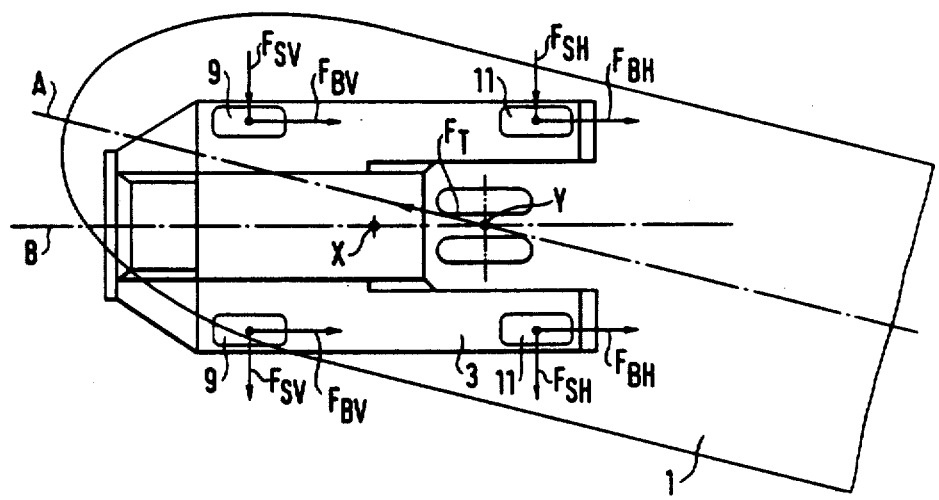
FIG. 2 is a schematic plan view of a towing unit illustrating the forces which occur during braking.

The front wheels 9 or the rear wheels 11, preferably, however, all four wheels are steerable for maneuvering the towing vehicle 3. FIG. 2 shows a position of the towing vehicle 3 and the aircraft 1 which can occur while negotiating through a curve. The illustrated relative position of the two can also occur during straight-ahead driving when, as a result of instabilities in the towing unit, the longitudinal aircraft axis A is angularly inclined relative to the longitudinal axis B of the vehicle.

The inertial force $F_T$ generated by the moving mass of the aircraft acts parallel to the longitudinal aircraft axis A on the towing vehicle at the point Y where the nose wheel is coupled to the vehicle. The inertial force results in a component force which acts in a direction transverse to the longitudinal axis B of the vehicle. This component force is counteracted by lateral traction forces acting on the wheels of the vehicle and generated as a result of the frictional engagement between the wheels and the road surface.

It will be observed that the lateral traction forces $F_{sv}$ acting on the front wheels 9 and the inertial force $F_T$ generate a rotational moment about a vertical X axis through the center of gravity of the vehicle, which tends to oversteer the vehicle, that is, which tends to increase the angle between the longitudinal axes A and B. Conversely, the lateral traction forces $F_{SH}$ acting on the rear wheels 11 and the inertial force $F_T$ generate an understeering rotational moment, that is, one which tends to reduce the angle between the two longitudinal axis These moments are normally approximately equal.

If the vehicle is braked, then the braking forces $F_{BV}$ or $F_{BH}$ are additionally brought to bear on the front and rear wheels. respectively. If, at any wheel, the resultant force of the lateral traction force and the braking force becomes greater than the road traction. overbraking occurs, that is, the affected wheel locks up, the wheel slips or slides on the road surface, and the lateral traction force is lost. If overbraking were to occur at the rear wheels while the front wheels still maintain their lateral traction. i.e., continue to rotate, then the stabilizing rotational moment suddenly disappears. The other rotational moment, however, continues to act, thereby suddenly increasing the angle between the axes A and B. When this angle becomes excessive, damage to the nose gear of the aircraft results. Above all, the pitching moment generated during braking by the mass of the towing vehicle and the aircraft weight applied to it by the nose wheel has the tendency of reducing the load carried by the aft wheels of the vehicle so that overbraking and slippage typically occurs at the aft wheels first.

The present invention eliminates this by always generating a braking force at the front wheels 9 which is substantially higher than that generated at the rear wheels 11. Consequently, any lateral slippage will first occur at the front wheels. In such an event, the front wheels g lose their lateral traction, thereby eliminating the rotational moment which tends to oversteer the vehicle while the understeering rotational moment generated by the rear wheels 11 is maintained and counteracts any increase in the angle between the longitudinal axes A and B. The feared jack-knifing is thereby prevented.

Tests at maximum braking forces have shown that with a given ratio between the braking forces generated at the front and rear wheels, it becomes a function of the mass and dead weight of the aircraft being towed and of the coefficient of friction of the roadway whether the rear wheels or the front wheels first lock up and begin to slip or slide. In order to safely realize the objective of the present invention of preventing premature mocking of the rear wheels, even under unfavorable conditions, the ratio between the braking forces generated at the front and rear wheels must not be too low and should at least be 2:1. On the other hand, the ratio should not be unnecessarily high, e.g., it should not be greater than about 8:1, because the braking force that can be generated at the front wheels is, of course, limited so that an excessively high ratio can only be achieved at the expense of losing braking capability at the rear wheels, and, therefore. reducing the overall braking effectiveness. A presently preferred ratio in accordance with the present invention is in the range from about 3:1 and 5:1. and preferably it is approximately 4:1.

Figure 3:
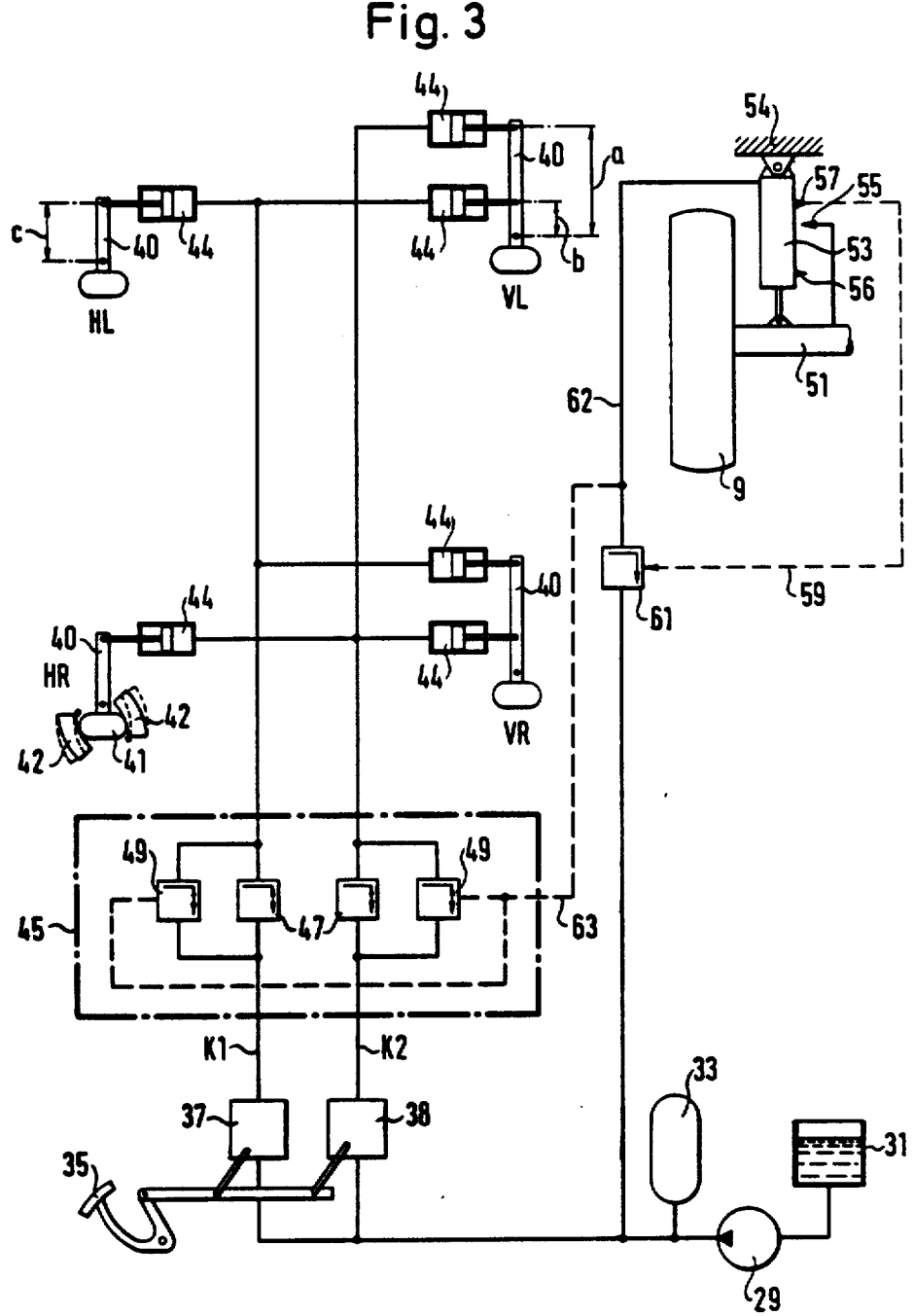
FIG. 3 is a schematic hydraulic-electric circuit diagram of the vehicle leveling and braking system employed by the towing vehicle of the present invention.

FIG. 3 shows the hydraulic system of the present invention schematically and in simplified form. It includes a pump 29 which generates the required pressurized hydraulic medium. A reservoir 31 is coupled with the pump and supplies it with the hydraulic medium. A pressure tank 33 may also be provided. By means of the vehicle's brake pedal 35, valves 37 and 38 are operated to distribute the hydraulic medium to two brake circuits. K1 and K2 A brake lever 40 is provided for each of the rear wheels HL and HR and each of the front wheels VL and VR. The brake lever 40 has cams 41 for activating. e.g.. radially expanding brake shoes 42 of a drum brake. as is schematically shown in FIG. 3 for the right rear wheel HR only. Brake cylinders 44 are in the form of hydraulic activators, are in fluid communication with brake circuits K1 K2 and activate brake levers 40. Specifically, one brake cylinder 44 is provided for the brake lever 40 of each rear wheel HL. HR and two brake cylinders 40 are provided for the brake levers of each front wheel VL. VR. These brake cylinders are appropriately connected with both hydraulic circuits K1, K2 and they act on the associated brake levers 40 with different effective lever arms a, b and c relative to the pivot axis of each lever arm.

All brake cylinders 44 are equally dimensioned. i.e., they are of the same size, they are subjected to the same hydraulic pressure and, therefore, they apply like forces to the lever. However, as a result of the different effective lever arms with which the brake cylinders act on brake levers 40, correspondingly differing braking forces are generated at the front wheels and the rear wheels. The lever arms are selected to obtain the desired ratio between the braking forces generated at the front wheels and at the rear wheels; for example, they are selected to establish a ratio of 4:1.

Additionally, each hydraulic circuit, for example circuit K2, has a hydraulic cylinder 44 which acts on a front wheel, for example wheel VL. at one side of the vehicle with the relatively larger lever arm a. The circuit K2 is further coupled with brake cylinders 44 on the other side of the vehicle. i.e.. one is coupled with rear wheel HR with the lever arm c and the other with front wheel VR which has the relatively shorter lever arm b. The lever arms are so selected that the braking force generated at the front wheel VL at the one side of the vehicle is equal to the sum of the braking forces generated at the front and rear wheels VR. HR on the other side of the vehicle. The same, correspondingly reversed, applies to the other hydraulic circuit K1. This ensures that even when one of the two hydraulic circuits K1, K2 fails, the other, still operational circuit will generate braking forces which are equal on both sides of the vehicle and which, moreover, are distributed between the front and rear wheels in the desired ratio. If the desired ratio is 4:1. this is obtained, for example, when the ratio between the lengths of the lever arms a, b, c is about 5:3:2.

FIG. 3 also shows a device 45 for limiting the braking force generated by each of the two hydraulic circuits K1, K2 at the front or rear wheels to a predetermined maximum when the brakes are fully applied. In one embodiment of the present invention, the braking force limiting device 45 for each of the two brake circuits comprises a first pressure limiting valve 47, which normally limits the hydraulic pressure applied to cylinders 44 to an initial maximum value B1. An additional parallel, adjustable pressure limiting valve 49 is provided. By opening the valves 49, pressure in the hydraulic circuits K1, K2 can be increased above and beyond the maximum pressure set by the first limiting valve 47. Thus, pressure in excess of B1 and controlled by the extent to which valves 49 are open can be supplied to the hydraulic actuators for the brakes.

According to the present invention, such excess hydraulic pressure is applied as a function of the load brought to bear on the towing vehicle by the nose wheel of the aircraft, such load being made up of the static dead weight and of the additional dynamic loading encountered during braking. The towing vehicle is equipped with a leveling system to ensure that the desired vehicle ground clearance is maintained independent of the load. Such leveling systems are known in the art and, consequently, only a simplified example is schematically shown in FIG. 3.

A wheel support 51, for example, for a front wheel 9, is supported on the frame by a hydraulic cylinder 53 (and, of course, by a spring suspension, omitted here for simplicity's sake). A switch activator 55 is associated with hydraulic cylinder 53 and cooperates with two limit switches 56, 57. In response to a weight-dependent increase in the compression of the suspension for front wheel 9 limit switch 57 is activated. This opens a valve 61 in hydraulic line 62 leading to the cylinder 53 via an electric control circuit 59, thereby feeding additional hydraulic fluid to cylinder 53 to increase the pressure therein and extend the suspension until the original ground clearance has been reestablished.

In such a system, the pressure in the cylinder 53 and, therefore, in line 62, is essentially proportionate to the load applied to the towing vehicle by the nose wheel of the aircraft being towed. In accordance with the present invention, the setting of the adjustable pressure limiting valve 49 in each of the hydraulic circuits K1. K2 is changed as a function of the pressure prevailing in the line 62 and operatively coupled with the valve by a hydraulic control conduit 63. Valve 49 is opened when the pressure in the leveling system, which in turn is a function of the load carried by the towing vehicle exceeds a predetermined value. A commensurate increase in the maximum braking force that can be generated by hydraulic circuits K1, K2 is thereby achieved.

Figure 4:
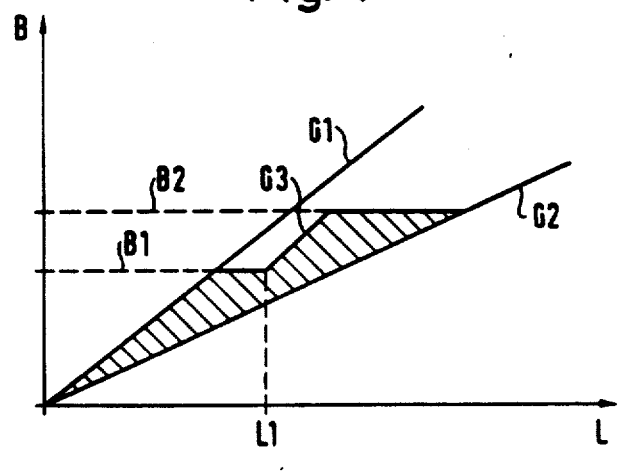
FIG. 4 is a diagram which shows the relationship between the maximum braking force and the aircraft dead weight.

FIG. 4 shows a preferred form of the relationship between the maximum braking force, that is, the maximum braking force obtained when the brakes are fully applied, and the load carried by the towing vehicle. The total load, i.e., the weight of the towing vehicle and the load carried by it is plotted on the abscissa and the effective maximum braking force on the ordinate. Straight line G1 shows the maximum braking force that could be obtained as a result of friction between the wheels and the road surface. Straight line G2 shows the legally prescribed minimum braking force of 45% (which is defined as the ratio between the maximum obtainable braking force that can be generated on a dry road surface and the sum of the axle loads). The actual braking force generated during maximum braking must fall in the area between lines G1 and G2.

In accordance with the present invention, the limiting valves 47 of the braking force limiting device 45 limit the maximum braking force to an initial maximum value B1 which is maintained as long as the total weight of the maneuvering vehicle, including the weight carried by it, does not exceed a predetermined value L1. This value L1 is selected to be greater than the load that is encountered when towing standard passenger aircraft of the smaller types, such as, for example, the Boeing B737, B757 or the Airbus A300. The braking systems is configured so that the maximum braking force B1 that can be generated by using limiting valves 47 is sufficient to effect braking of the empty towing vehicle at the legally prescribed 45 minimum braking ratio but, on the other hand, does not exceed the maximum force permissible for the nose gear of these smaller types of aircraft. An appropriate value for L1 is, for example, a total load of approximately 240 kN while the corresponding maximum braking force B1 can be set to be, for example, approximately 140 kN. distributed, as has been stated above, in a 4:1 ratio between the front and rear wheels.

If, during the towing of larger aircraft types, such as, for example, wide-bodied planes like the DC10 or Boeing B747, the preset weight value L1 is exceeded and the pressure in the leveling system increases commensurately, then the opening of valve 61 (FIG. 3) will apply the increased hydraulic pressure to adjustable valves 49. The pressure in hydraulic circuits is thereby proportionally increased which in turn linearly increases the maximum braking force in conformity with line G3 in FIG. 4. This weight-proportional increase in the maximum braking force terminates at a second maximum braking force B2 which is determined by the operational limit, or capacity, of the braking system installed on the towing vehicle. This second maximum force B2 does not correspond to the maximum braking force that could be obtained if identical braking forces were generated by all the wheels of the vehicle. As a result of the lower braking force generated by the rear wheels in accordance with the present invention, a loss in total braking force occurs and, given a 4:1 braking pressure ratio between the front and rear wheels, the maximum force B2 will correspond to only about 5/8 of the theoretical braking capacity. Among the braking systems actually encountered, the maximum force B2 is less than the permissible maximum force which may be applied against the nose gear of the larger passenger aircraft of the above-mentioned types. In the event this were not the case, the maximum force B2 would have to be appropriately lowered by further limiting the pressure applied to and/or released by the adjustable limiting valves 49. From the foregoing it is apparent that the maximum braking force generated on a dry road surface will, as a function of weight, be within the cross-hatched area of FIG. 4. Lesser braking forces will, of course, be obtained on wet or slippery road surfaces. These will lie below the straight line G2.

By virtue of the weight-dependent control of the maximum braking force, a correspondingly greater braking force is obtained when the brakes are fully applied when maneuvering large and heavy aircraft having nose gears which are also commensurately larger and stronger and can withstand correspondingly greater braking forces. The value B2 can, for example, be 200 kN. which, given a 4:1 ratio, corresponds to a maximum braking force of 160 kN at the front wheels and 40 kN at rear wheels.

What is claimed is:

1. A braking system for a towing vehicle adapted to tow another vehicle such as an aircraft, the towing vehicle having a front wheel and a rear wheel, each fitted with a brake, at each side of the vehicle, the system comprising braking means including first and second independent brake circuits for applying braking forces to each of the wheels so that the braking force applied to the front wheels exceed the braking forces applied to the rear wheels and the braking forces applied to the wheels on each side of the vehicle are equal when the first brake circuit and when the first and second brake circuits are active, the first and second brake circuits each being operatively coupled with the brakes of the front wheels at each side and a rear wheel at one side of the vehicle for activating the brakes and thereby generating braking forces at the wheels; and control means operatively coupled with the brake circuits and the associated brakes for controlling the braking forces generated at the respective wheels so that for each brake circuit the sum of the braking forces generated by said brake circuit at the front wheel and the rear wheel on one side of the vehicle substantially equals the braking force generated by the same brake circuit at the front wheel on the other side of the vehicle.

2. A braking system according to claim 1 wherein the brake for each wheel includes a pivotally mounted braking lever operatively coupled with the brake and at least one of the brake circuits; wherein the brake circuits include substantially identical actuators for the brakes at each wheel generating substantially identical activating forces; and including differential braking means associated with the brakes at the respective wheels operatively coupled with at least one of the braking circuits for generating a braking force at each wheel which differs from the braking force generated by the same circuit at the other wheels.

3. A braking system according to claim 2 wherein the differential braking means comprises a greater number of brake actuators for some wheels than for others.

4. A braking system according to claim 3 wherein the differential braking means comprises pivotable braking levers coupled with the actuators for activating the brakes of the wheels, all levers having differing distances between pivot axes of the levers and respective points where the actuators coupled with a given braking circuit act on the lever.

5. A braking system according to claim 4 wherein each braking circuit is operatively coupled with two front wheels and one rear wheel, and wherein each front wheel is provided with at least two actuators, one each operatively coupled with one of the braking circuits.

6. A braking system according to claim 5 wherein the levers associated with the rear wheels have a distance between their pivot axes and the associated point which is shorter than corresponding distances on each lever associated with each of the front wheels.

7. A braking system according to claim 6 wherein the ratios of the distances on the lever associated with each front wheel and on the lever associated with each rear wheel is about 5:3:2.

8. A braking system according to claim 3 wherein the braking circuits comprise hydraulic circuits, and wherein the actuators comprise hydraulic actuators.

9. A braking system according to claim 8 wherein the braking levers for the brakes at each front wheel includes two hydraulic actuators engaging the levers at points which are differently spaced from a pivot axis of the lever; wherein the lever for each rear wheel is coupled to one hydraulic actuator; and wherein the hydraulic actuator of each rear wheel is hydraulically coupled with the same hydraulic circuit as the hydraulic actuator for the front wheel on the same side of the Vehicle acting on the lever at a relatively lesser spacing from its pivot axis and the same hydraulic actuator as the hydraulic actuator for the brake of the front wheel on the other side of the vehicle acting on the lever at a relatiVely greater spacing from its pivot axis.

10. A braking system according to claim 3 wherein the ratio between the braking forces generated by the front wheels and the rear wheels is in the range between about 2:1 and 8:1.

11. A braking system according to claim 10 wherein the ratio is between about 3:1 and 5:1.

12. A braking system according to claim 11 wherein the ratio is about 4:1.

13. A braking system according to claim 1 wherein the towing vehicle includes means for carrying a load comprising a portion of the weight of said another vehicle to be towed; and including sensor means for sensing the magnitude of the load carried by the towing vehicle; means for limiting the maximum braking force which is generated with the braking system to a preset value so long as the load sensed by the sensor means is below a predetermined level; and means for increasing the maximum braking force that is generated with the braking system above the preset value as a function of an increase in the load sensed by the sensor means above the predetermined level.

14. A braking system according to claim 13 wherein the braking circuits are hydraulic circuits and the actuators are hydraulic actuators, wherein the towing vehicle includes a hydraulic levelling system for maintaining a substantially constant ground clearance for the towing vehicle irrespective of the load carried thereby; and wherein the sensor means includes means operatively coupled with the limiting means for sensing changes in the hydraulic pressure in the hydraulic levelling system, and means using changes in the hydraulic pressure for changing the pressure in the hydraulic braking circuits to thereby increase the maximum braking force above the predetermined level.

15. A braking system according to claim 14 wherein the towing vehicle comprises a towing vehicle for aircraft, and including means for raising the nose wheel of the aircraft into a towing position, and means for clamping the nose wheel in its towing position to the towing vehicle.

16. A braking system for towing vehicles adapted to tow another vehicle such as an aircraft, the towing vehicle having a hydraulically actuated brake for at least a front wheel and at least a rear wheel on each side of the vehicle; the system comprising first and second, independent hydraulic braking circuits, each circuit being operatively coupled to each of the brakes for the front wheels and the brake of one of the rear wheels; braking means for applying braking forces to each of the wheels so that irrespective of whether or not one of the braking circuits is inoperative the braking forces applied to the front wheels exceed the braking forces applied to the rear wheels and the braking forces applied to the wheels on each side of the vehicle are equal, the braking means including first control means operatively coupled with the brakes activated by the respective hydraulic circuits for generating with each circuit braking forces at the front wheels which are substantially greater than the braking forces generated with the same circuit at the associated rear wheel, and second control means for generating with each hydraulic braking circuit a total braking force at the wheels on one side of the vehicle which is substantially equal to the braking force on the other side of the vehicle.

17. A braking system according to claim 16 including sensor means on the vehicle for sensing a load carried by the vehicle, and compensating means operatively coupled with the hydraulic circuits and the sensor means for increasing the pressure of hydraulic fluid in the circuits in response to and as a function of a load carried by the vehicle in excess of a predetermined load, whereby the maximum braking force that can be generated by the wheels is increased when the vehicle carries a relatively large load which is in excess of the predetermined load.

* * * * *